(12) United States Patent
Guthke et al.

(10) Patent No.: US 7,938,365 B2
(45) Date of Patent: May 10, 2011

(54) LINE HOLDER IN AN AIRCRAFT (75) Inventors: Hans-Peter Guthke, Buxtehude (DE); Lueder Kosiankowski, Jork (DE); Lutz Zeuner, Hardebek (DE)

(73) Assignee: Airbus Deutschland GmbH (DE)

( * ) Notice: Subject to any disclaimer, the term of this patent is extended or adjusted under 35 U.S.C. 154(b) by 1265 days.

(21) Appl. No.: 11/466,234

(22) Filed: Aug. 22, 2006

(65) Prior Publication Data

US 2007/0138353 A1    Jun. 21, 2007

Related U.S. Application Data (60) Provisional application No. 60/710,071, filed on Aug. 22, 2005.

(30) Foreign Application Priority Data

Aug. 22, 2005   (DE) ................. 10 2005 039 652

(51) Int. Cl.
*F16L 3/22* (2006.01)
*F16L 3/10* (2006.01)

(52) U.S. Cl. ............... 244/129.1; 244/1 R; 248/68.1; 248/70

(58) Field of Classification Search ............ 244/1 R, 244/121, 118.1, 129.1, 131; 248/65, 68.1, 248/70, 230.6, 231.61, 74.1, 231.71
See application file for complete search history.

(56) References Cited

U.S. PATENT DOCUMENTS 1,888,342 A * 11/1932 Anderson ............ 248/68.1

(Continued)

FOREIGN PATENT DOCUMENTS

DE            627281         2/1935

(Continued)

OTHER PUBLICATIONS

German Oral Proceeding, dated Nov. 11, 2010, issued in corresponding German Patent Application No. 10 2005 039 652.6-55, total 3 pages.

*Primary Examiner* — Timothy D Collins
*Assistant Examiner* — Joseph W Sanderson
(74) *Attorney, Agent, or Firm* — Ostrolenk Faber LLP (57) ABSTRACT

The invention relates to a holder module for affixing lines of various thicknesses in an aircraft, as well as to a holder system comprising two of the above-mentioned holder modules. Furthermore, the invention relates to a method that makes it possible to lead lines reliably and in an ordered manner through an aperture in a structural component of an aircraft. Finally, the invention relates to an aircraft that is equipped with a plurality of the above-mentioned holder modules, as well as to the use of a plurality of the holder modules according to the invention in an aircraft. The holder module comprises a basic body as well as at least one cross arm. The basic body comprises at least one bearing face to accommodate or support a line. Corresponding to the basic body, the cross arm, too, comprises at least one counter-bearing face that interacts with the bearing face of the basic body. To make it possible for the holder module to reliably accommodate at least one line, the at least one cross arm is movably positioned in relation to the basic body such that the line, due to movement of the at least one cross arm is affixed between the at least one bearing face of the basic body and the at least one counter-bearing face of the at least one cross arm.

19 Claims, 10 Drawing Sheets

U.S. PATENT DOCUMENTS

| | | | |
|---|---|---|---|
| 2,081,047 A | 5/1937 | Basch | |
| 2,712,167 A | 3/1951 | Blanchard | 24/569 |
| 4,131,257 A * | 12/1978 | Sterling | 248/67.5 |
| 6,883,761 B2 * | 4/2005 | Boon et al. | 248/74.1 |
| 7,506,848 B2 * | 3/2009 | Heiselbetz et al. | 248/200 |
| 2004/0159751 A1 * | 8/2004 | Boon et al. | 248/74.1 |

FOREIGN PATENT DOCUMENTS

| | | |
|---|---|---|
| DE | 718025 | 2/1942 |
| DE | 40 38 690 A1 | 6/1992 |
| DE | 298 01 765 U1 | 6/1998 |
| GB | 431569 | 7/1935 |

* cited by examiner

LINE HOLDER IN AN AIRCRAFT

REFERENCE TO RELATED APPLICATIONS

This application claims the benefit of the filing date of U.S. Provisional Patent Application No. 60/710,071 filed Aug. 22, 2005 and of German Patent Application No. 10 2005 039 652.6 filed Aug. 22, 2005, the disclosures of which are hereby incorporated herein by reference.

FIELD OF THE INVENTION

The present invention generally speaking relates to the technical field of equipment installation in the fields of aircraft technology and space technology. In particular, the invention relates to a holder module for affixing lines of various thicknesses. Furthermore, the invention relates to a holder system comprising two of the above-mentioned holder modules. Moreover, the invention relates to a method that makes it possible to lead lines reliably and in an ordered manner through an aperture in a structural component of an aircraft. Finally, the invention relates to an aircraft that is equipped with a plurality of the above-mentioned holder modules, as well as to the use of a plurality of the holder modules according to the invention in an aircraft.

BACKGROUND OF THE INVENTION

In modern aircraft it is common to install a plurality of different electrical cables and pipes for controlling and supplying various devices and consumers. Within the context of the present patent application the term "line" is to be interpreted in its widest possible definition so that it includes in particular electrical cables, fluid-conducting pipes and hoses, bunches of the aforesaid lines, as well as any other supply lines in an aircraft.

In order to route such lines in an orderly manner in an aircraft, normally attachment elements in the form of cable holders are used, by which attachment elements the lines are affixed, at certain distances from each other, to suitable attachment faces of the vehicle. In this arrangement the holders are adapted to specific connection conditions of the attachment faces. These attachment faces are, for example, transverse supports, frame elements, stringers, ribs, and any other construction components of an aircraft, which within the context of the present invention are collectively referred to as structural components.

However, since the various respective structural components differ greatly from each other, many different cable holders have to be kept at hand. The required number of different cable holders to be kept further increases in that, for lines of different diameters or thicknesses, differently sized cable holders have to be kept in stock in order to be able to reliably fix each line. Thus, known cable holders are, for example, simple cable grips (Kabelschellen) that are only suitable for accommodating lines of a certain diameter range, which is why a plurality of different cable grips have to be kept in stock.

Furthermore, these cable grips are associated with problems in that with their use, orderly line routing is not possible, or is possible only with inadequate results. Since, as a rule, known cable grips are made from aluminium, these known cable holders, in addition, are associated with undesirably heavy intrinsic weight. Since the attachment of lines frequently takes place on conductive structural elements, moreover, due to the known cable grips being made from metal, special insulation regulations have to be observed so that, frequently, a complex earth connection on the conductive structural components has to be provided, which in turn is associated, in an undesirable manner, with additional weight.

Finally, with these known cable grips it is not possible to lead bunches of lines leading upwards or downwards through structural components, such as for example transverse supports, so as to route these bunches of lines without collision over or under other structural components, as well as air conditioning pipes, water pipes and the like.

SUMMARY OF THE INVENTION

Starting with the problems, described above, associated with known cable holders there may be a need to state a solution of a line holder that at least partly solves the problems described above.

Therefore, according to a first exemplary aspect of the present invention, a holder module for affixing lines of different thicknesses may be provided, which holder module includes a basic body as well as at least one associated crosshead. In the basic body at least one bearing face for accommodating and/or supporting a line may be formed. Furthermore, the basic body may include a contact face by which said basic body may be attached to a structural component of an aircraft, for example to a frame element, stringer, transverse support or rib etc. Corresponding to the basic body, the crosshead, too, may include at least one counter-bearing face that interacts with the bearing face of the basic body. In order to possibly be able to reliably accommodate at least one line from the holder module, the at least one crosshead may be movably positioned in relation to the basic body such that the line, due to movement of the at least one crosshead may be affixed or arrested between the at least one bearing face of the basic body and the at least one counter-bearing face of the crosshead, of which there is at least one.

Thus, movable positioning of the crosshead may be formed in such a way that said crosshead is at least able to move in a translatory manner towards the basic body and away from the basic body, and in doing so to possibly complete a tilting movement, in the manner of a balance arm, across the longitudinal alignment of the bearing faces of the basic body, during which tilting movement a counter-bearing face may approach the basic body while another counter-bearing face may move away from the basic body.

Movable positioning of the at least one crosshead or cross arm may in particular be such that the crosshead may undertake at least one translatory movement as well as three rotatory movements in the three possible degrees of freedom of rotation. Thus, the at least one cross arm may move in a translatory manner towards, and/or away from, the basic body, as well as at least to some extent be swung on all three coordinate axes. As a result of such movable positioning of the at least one cross arm good adaptation of the counter-bearing face of the cross arm to the lines to be accommodated may be achieved. In this way the cross arm may adapt to lines of different thicknesses. In particular, by a rockable or seesawable design of the cross arm in the form of a balance arm, accommodation of two lines of different thicknesses may become possible in the holder module.

To possibly avoid complying with the previously mentioned insulation regulations, for example in the form of earth or ground connections on conductive structural aircraft components, the holder module according to an exemplary embodiment of the invention may, for example, be made from a plastic material. Because in the exemplary embodiment possibly both the basic body and the at least one cross arm are made from a plastic material, not only the above-mentioned insulation regulations may be complied with, but in this way—different from the design of the holder module made of metal—weight reduction may be achieved, which may always be desirable in the field of aircraft- and space technology.

According to an exemplary embodiment, both the at least one bearing face of the basic body and the at least one counter-bearing face of the at least one cross arm may be conduit-shaped or trough-shaped. Using such a shape it might be possible to achieve line routing that is as regular or ordered as possible. The cross section of the bearing face or the counter-bearing face may be concave, U-shaped or, for example, V-shaped. Such a conduit-like design of the bearing face or the counter-bearing face may be associated with a positive effect in that a line that is to be affixed by the holder module may reliably be placed in the bearing face of the basic body in order to—due to the movement of the cross arm and the basic body towards each other—be able to reliably affix the line put in place in this way, with a counter-bearing face that corresponds to the bearing face.

According to an exemplary embodiment the basic body may comprise several parallel conduit-like bearing faces, wherein in this case also the at least one cross arm may comprise several corresponding parallel conduit-like counter-bearing faces. This arrangement may enable to possibly affix more than one line in the holder module. Since frequently no more than two lines have to be routed parallel along extended distances, the basic body as well as the at least one cross arm may comprise two parallel conduit-like bearing faces or counter-bearing faces that converge into each other in a wave-like manner. Such a design of several conduit-like bearing faces in one and the same holder module may save additional weight because it may obviate the need to attach each individual line with a single holder module to a structural component.

As already explained above, the holder module according to an exemplary embodiment of the invention among other things may also be used for its ability to reliably affix lines of different thicknesses. However, according to an exemplary embodiment in order to be possibly able to accommodate very thin lines, due to the design and shape of the at least one cross arm it may be necessary to provide at least one opening in the bearing face of the basic body, into which opening at least one cross arm may at least partly move when said cross arm, for affixing a very thin line, approaches the bearing face of the basic body.

According to an exemplary embodiment the holder module may further include at least one tensioning element, by which the at least one cross arm is movably connected to the basic body. This may possibly cause the at least one cross arm to make a movement, in its translatory degree of freedom, in the direction of the basic body. This tensioning element may, for example, be designed in the shape of a screw with an associated nut so that by shortening the distance between the screw head and the nut a reduction in the distance between the at least one cross arm and the basic body may be achieved. To this effect the nut may be accommodated, for example in or on the basic body or in or on the cross arm, into which the screw shaft screws, starting from the respective other holder module part—either the basic body or the cross arm. According to an exemplary embodiment of the invention, the nut may be designed as a cylindrical body, a so-called barrel nut, through which a screw thread extends crosswise to accommodate the screw. Designing the nut as such a barrel nut may have a positive effect in that in this case the cylinder may act as a rotary axis, on which the cross arm may be tilted in the manner of a balance arm, so as to possibly accommodate two lines of different thicknesses, as has been described above.

According to an exemplary embodiment of the invention in the holder module the at least one tensioning element extends between a first abutment, which is formed in the at least one opening of the basic body and a second abutment, which is formed in the cross arm. This may possibly allow secure tensioning or fixing at least one bunch of lines between the bearing face of the basic body and the counter-bearing face of the cross arm. In this arrangement the two buttresses may be used to support the associated abutment bodies of the tensioning element, for example in the form of the above-mentioned nut and the screw head, when the tensioning element is shortened, so as to cause movement of the cross arm in the direction of the basic body due to shortening of the tensioning element. The first abutment may, for example, accommodate a ball segment, through which in turn the tensioning element, for example in the form of a screw, may reach. In this arrangement the ball segment in conjunction with the first abutment may form a ball joint that may provide three degrees of freedom. With such a design of a ball joint the tensioning element may not only be swung on two rotary axes that are perpendicular in relation to its longitudinal axis, but also may also be rotated about its longitudinal axis. In the case where the ball joint designed in this way is arranged in the at least one opening in the basic body, between the two parallel conduit-like bearing faces, symmetrical force impingement of the cross arm by way of the at least one tensioning element may be achieved.

As already mentioned, the nut associated with the screw may, for example, be designed as a cylinder. If this cylinder is arranged in the cross arm, it may form a hinge joint in conjunction with the second abutment that is also formed therein, which hinge joint may, for example, be arranged in the at least one cross arm between the two parallel conduit-like counter-bearing faces so that the swivelling axis of said hinge joint extends in the direction of the two parallel conduit-like counter-bearing faces. This design may make it possible for the at least one cross arm to form a balance arm that may be tilted such that the counter-bearing faces of said cross arm may be able to optimally adapt to lines of different thicknesses, which lines are to be accommodated by the holder module according to an exemplary embodiment of the invention.

According to an exemplary embodiment the bearing faces of the basic body can be of at least partially concave or convex shape, when viewed in longitudinal direction, so that, for example, line routing also in the region of already existing air conditioning pipes or water pipes may become possible without any collisions, because as a result of this shape of the bearing faces the lines to be routed may lead either over or under the existing lines. Thus, it may be possible to obtain the ordered possible routing of lines that lead upwards or downwards. Moreover, the at least one bearing face of the basic body may have a positive or negative inclination in relation to the contact face, which means that the bearing face meets the contact face at an acute (positive) or an obtuse (negative) angle. By such an inclination of the bearing faces neat bridging of height of a line bundle to be routed may be achieved.

As demonstrated by the above explanations, in one exemplary embodiment the present invention may provide a holder module that is designed for reliably and neatly affixing lines of different thicknesses. The movable arrangement of the cross arm may ensure easy placement of the lines on the bearing faces of the basic body, in that the cross arm may be brought to an unlocked position in which it extends so as to be essentially parallel in relation to the longitudinal direction of the bearing faces of the basic body. As an example in order to affix the lines in the holder module, starting from this unlocked position, because of its movable bearing arrangement the cross arm may be rotated, by approximately 90° about the longitudinal axis of the tensioning element, to a locked position in which the tensioning element is activated for affixing the lines between the bearing face of the basic body and the counter-bearing face of the cross arm. If the lines to be affixed differ as far as their thicknesses are concerned, when the tensioning element is activated, the at least one cross arm may tilt on its swivelling axis, which extends so as to be essentially parallel in relation to the two counter-bearing faces of the cross arm. As a result of this tilting of the cross arm, said cross arm may adapt to the lines of different thicknesses, so that reliably affixation of lines of different thicknesses may be ensured.

According to a further exemplary aspect of the present invention a holder system is provided that may make it possible to regularly lead lines of different thicknesses through an aperture in a structural component. The holder system is essentially comprised of two holder modules with the features described above, wherein the contact face of the first holder module is spaced apart from the contact face of the second holder module by the structural component to which the first holder module and the second holder module can be affixed by the associated contact faces, such that the at least one bearing face of the first holder module continues through the aperture in the at least one bearing face of the second holder module.

According to still another exemplary aspect of the present invention a method for the regular leadthrough of lines through an aperture in a structural component is provided. To this effect, first a first holder module, as described above, is attached on one side of the aperture, with the contact face of said holder module resting against the structural component. Likewise, a second holder module, as described above, is attached on another side of the aperture, with the contact face of said holder module resting against the structural component. Already before, during or after attachment of the first and second holder modules to the structural component at least one line can be led through the aperture in the structural component so as to be placed on their bearing faces after the two holder modules have been affixed. Subsequently the cross arms of the two holder modules are moved from their unlocked position to the previously described locked position, in which the counter-bearing faces of the cross arms face the bearing faces of the basic bodies, spaced apart by the at least one line. The cross arms are then moved towards the basic body so that the at least one line is firmly clamped between the counter-bearing faces and the bearing faces, so that the at least one line is affixed.

According to yet another exemplary aspect of the present invention, an aircraft comprising at least one line is stated, which line is attached to structural components of the aircraft by a plurality of holder modules with the features described above, in order to route said line at least in part through the aircraft.

According to yet another exemplary aspect of the invention, the use of a plurality of holder modules with the previously described features is proposed in order to affix at least one line to structural components of an aircraft so that said line can at least in part be routed through the aircraft.

BRIEF DESCRIPTION OF THE DRAWINGS

Below, the invention is explained by way of examples with reference to the attached drawings. The exemplary embodiment described in the figures only serves to provide a better understanding of the invention, and in particular must not be interpreted as limiting the scope of the patent in any way. The following are shown:

FIG. 3A shows the connection in FIG. 3 of the bearing face to the contact face of the holder module by a simplified diagram;

FIG. 4A shows the connection in FIG. 4 of the bearing face to the contact face of the holder module by a simplified diagram;

Across all the figures, the same or corresponding reference signs are used for identical or similar elements. The illustrations in the figures are not necessarily to scale, but they indicate qualitative size relationships.

DESCRIPTION OF PREFERRED EMBODIMENTS OF THE INVENTION

Below, the present invention is described in detail with reference to FIGS. 1-12, wherein in the respective passages of description predominantly one figure is referred to; however, to gain a better understanding the remaining figures should be regarded in parallel.

Figure 1:
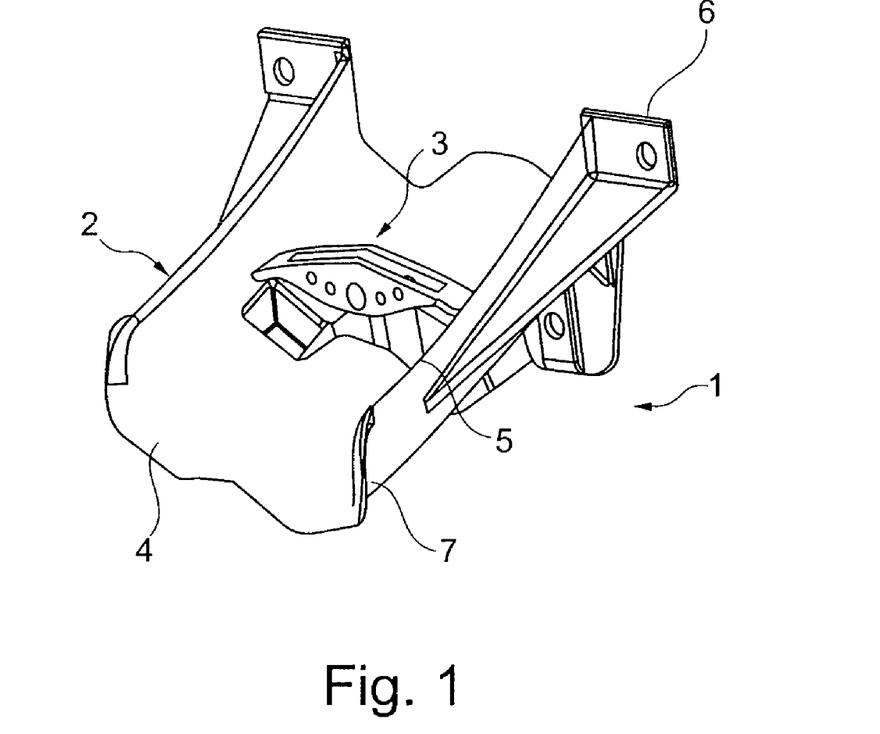
FIG. 1 shows a perspective view of a holder module according to an exemplary embodiment of the invention with a positively inclined bearing face.
Figure 2:
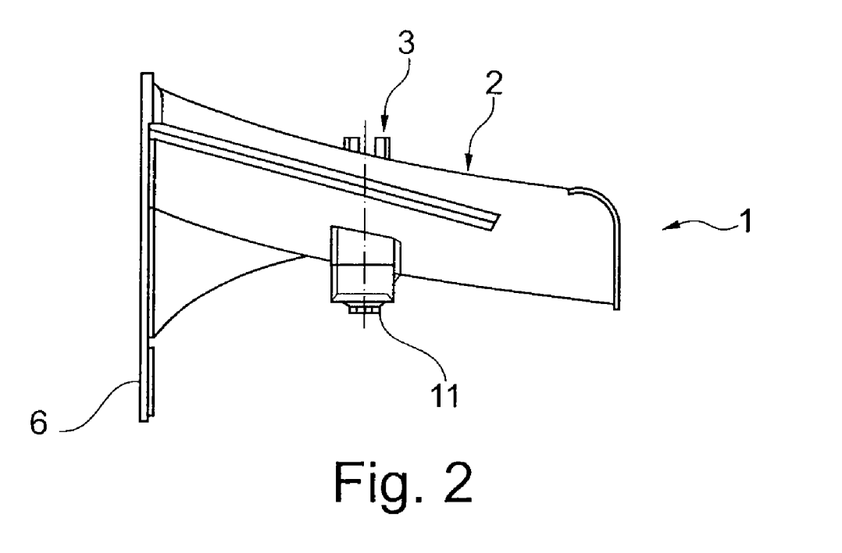
FIG. 2 shows a lateral view of the holder module shown in FIG. 1.

FIG. 1 shows a perspective view of a holder module 1 according to an exemplary embodiment of the invention. The holder module 1 essentially comprises or is comprised of a basic body 2 and a cross arm or crosshead 3. The basic body 2 and the cross arm 3 can be made from a plastic material. Along its face the basic body 2 comprises a bearing face 4 for accommodating a line (not shown) and on one end is closed off by a contact face 6 by which the basic body can, for example, be attached to a structural component of an aircraft. As shown in FIG. 2, the contact face 6 is inclined in relation to the main direction of extension of the basic body 2 and forms a flat face or area in which three boreholes are provided for attaching the holder module 1 to a structural component.

FIG. 1 also shows that the cross arm 3 is arranged above the bearing face 4 of the basic body 2 so that the counter-bearing face 5 of the cross arm 3 faces the bearing face 4 of the basic body 2 at a distance.

Figure 3:
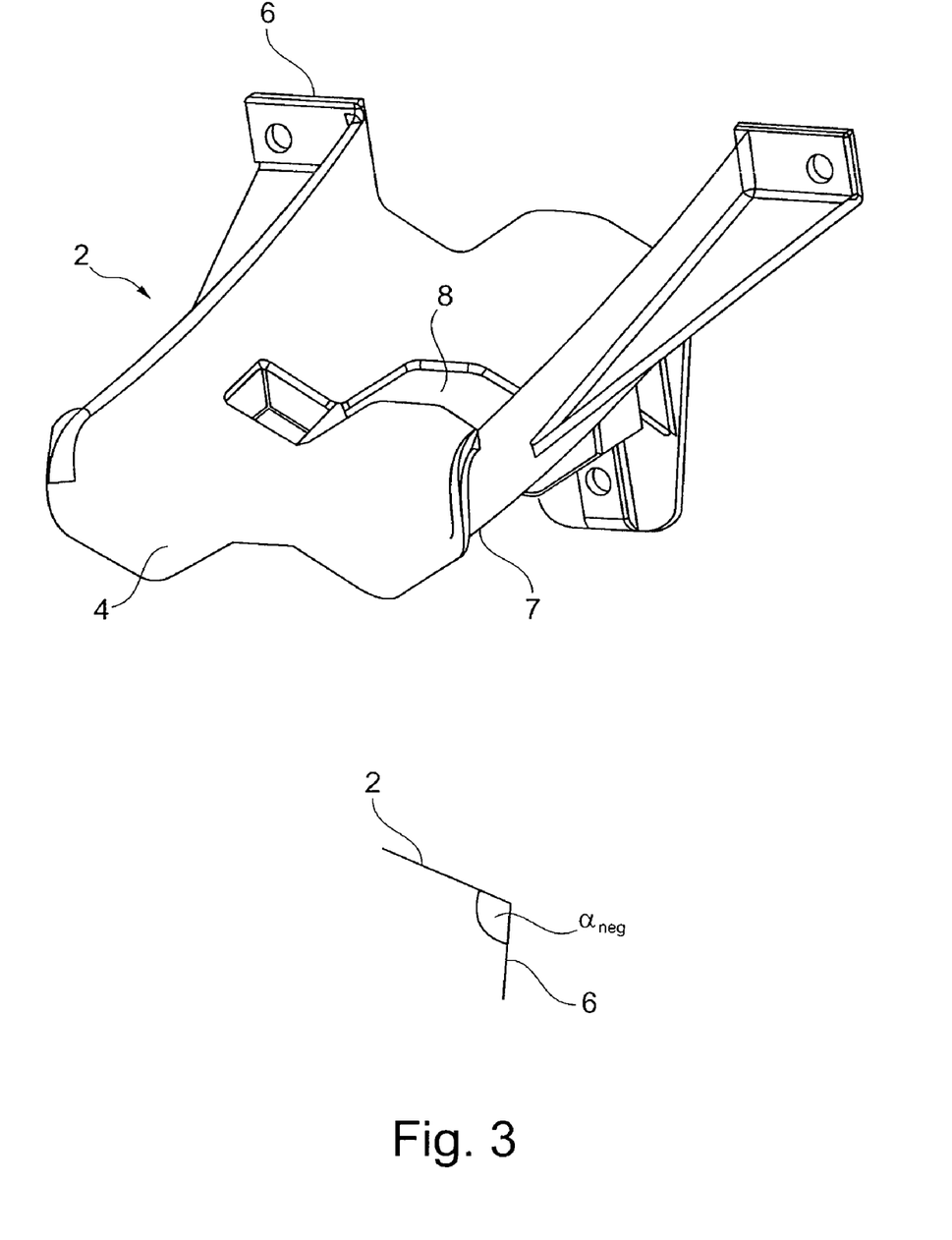
FIG. 3 shows an enlarged perspective view of the basic body of the holder module of FIG. 1 according to an exemplary embodiment of the invention with a positively inclined bearing face.
Figure 4:
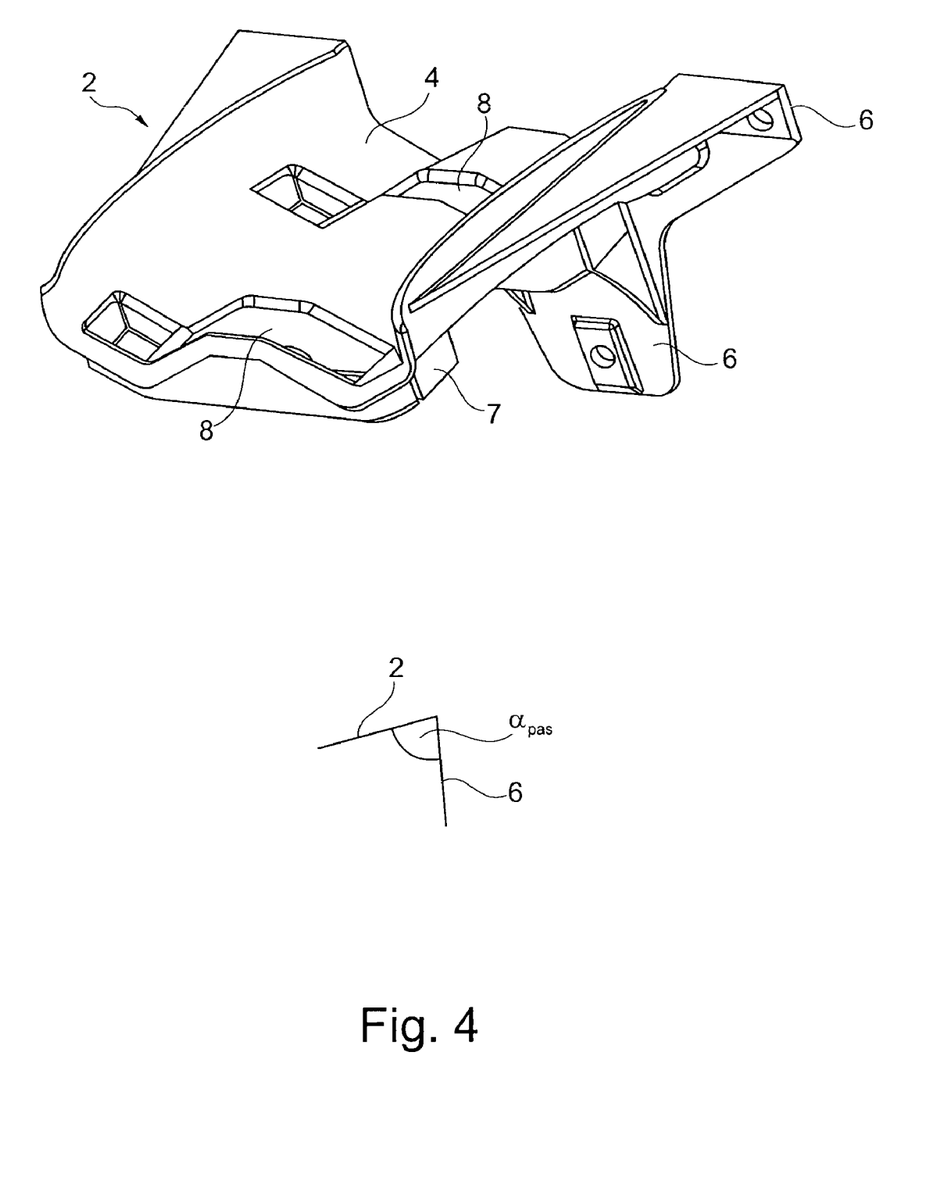
FIG. 4 shows a perspective view of a basic body of a holder module according to an exemplary embodiment of the invention with a negatively inclined bearing face.

FIG. 3 is a somewhat enlarged view of the basic body 2 of FIG. 1 and shows that in the bearing face 4, across the main direction of extension of said bearing face 4, a recess 8 is provided which, as will be explained in detail later, is used for at least partly accommodating the cross arm 3. Correspondingly, FIG. 4 shows a perspective view of a basic body 2 in whose bearing face 4, spaced apart from each other across the main direction of extension of the bearing face 4, two recesses 8 are provided, each for accommodating a cross arm. In the basic body 2 shown in FIG. 3 the bearing face 4 connects to the contact face 6 at an acute angle, as is shown in FIG. 3A by a simplified diagram. In the context of the present invention such a connection of the bearing face 4 at an acute angle in relation to the contact face 6 is referred to as a positive inclination. In contrast to this in FIG. 4 the bearing face 4 connects to the contact face 6 at an obtuse angle as shown in the simplified diagram in FIG. 4A. In the context of the present invention such a connection of the bearing face 4 at an obtuse angle in relation to the contact face 6 is referred to as a negative angle.

While FIGS. 1, 3 and 4 to some extent show that the respective bearing faces 4 are in the shape of a curved wave, this curved wave shape is more clearly shown in conjunction with FIG. 8, which will however be discussed later. The bearing face 4 of the basic body 2 is on each side delimited by a respective lateral flange 7, as a result of which further securing of the position of a line to be affixed may be ensured.

Figure 5:
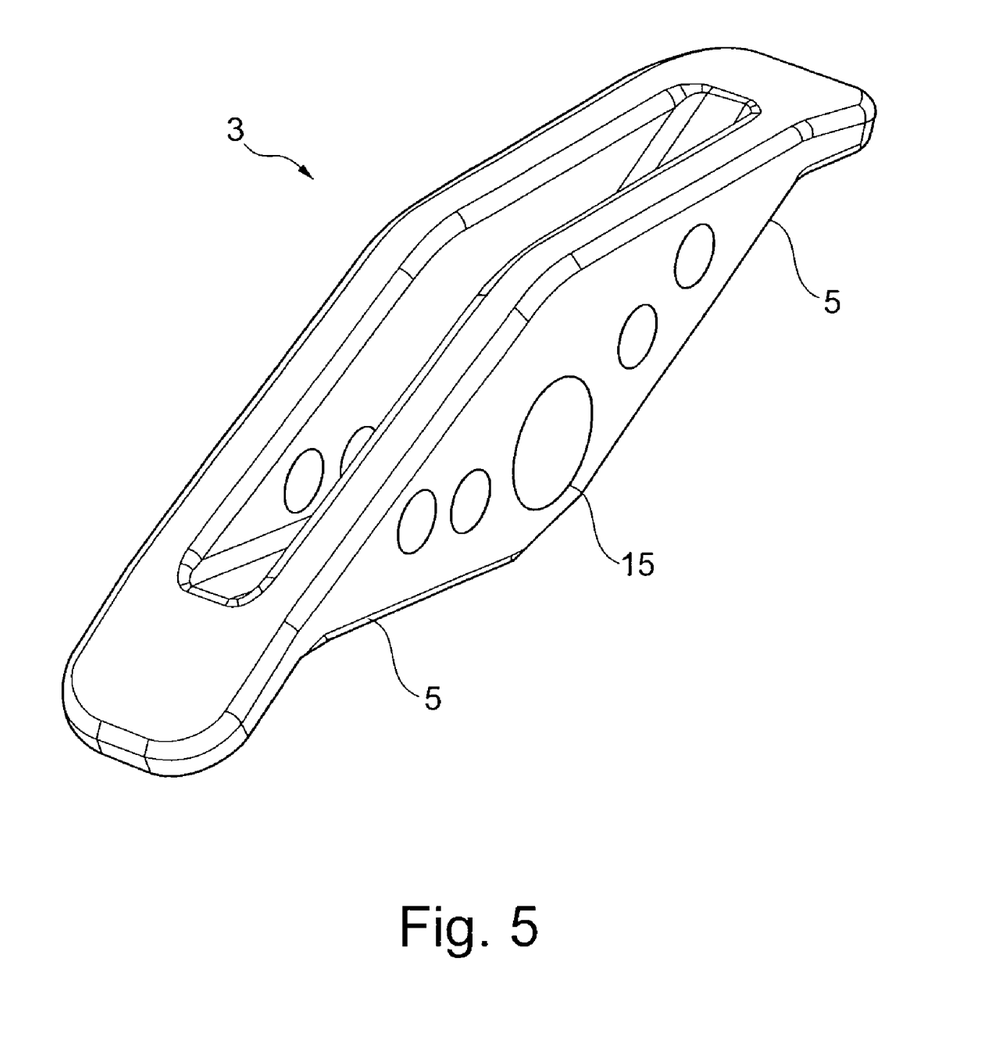
FIG. 5 shows a perspective view of a cross arm or crosshead.
Figure 6:
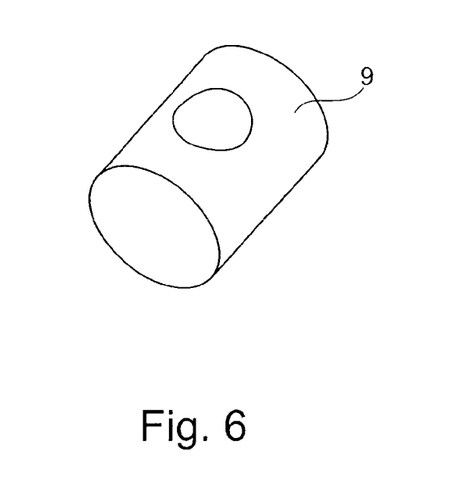
FIG. 6 shows a perspective view of a barrel nut held in the cross arm.

FIG. 5 shows a perspective view of a cross arm 3 whose underside comprises two merging counter-bearing faces 5, arranged offset, wherein the cross section of said counter-bearing faces 5 that are connected to each other in turn forms a wave shape. In the middle of the cross arm 3, horizontally through it, a central through-opening 15 extends in which the barrel nut 9 shown in FIG. 6 is fittable as a rotary axis around which the cross arm can be rocked or seesawed as a balance arm.

Below, reference is made to the same extent to FIGS. 7 to 9. As shown in these figures, and in particular in FIG. 8, the cross arm 3 is arranged at a distance from the basic body 2 so that the bearing faces 4 of the basic body 2 face the counter-bearing faces 5 of the cross arm 3, spaced apart by the lines 10. The figures also show that the top of the basic body 2 is wave-shaped in the form of two bearing faces 4 that are parallel in relation to each other, and that the underside of the cross arm 3 is wave-shaped in the form of two counter-bearing faces 5 that are parallel in relation to each other. In the exemplary embodiments shown, the bearing faces 4 and the counter-bearing faces 5 are V-shaped; however, they can also be curved in a concave manner so as to be able to particularly reliably affix a line of a particular diameter.

By two articulated mechanisms 12, 13 the cross arm 3 is connected, so as to be articulated, to the basic body 2 with the use of a tensioning element 11 in the form of a screw, which will be discussed in more detail later.

Figure 7:
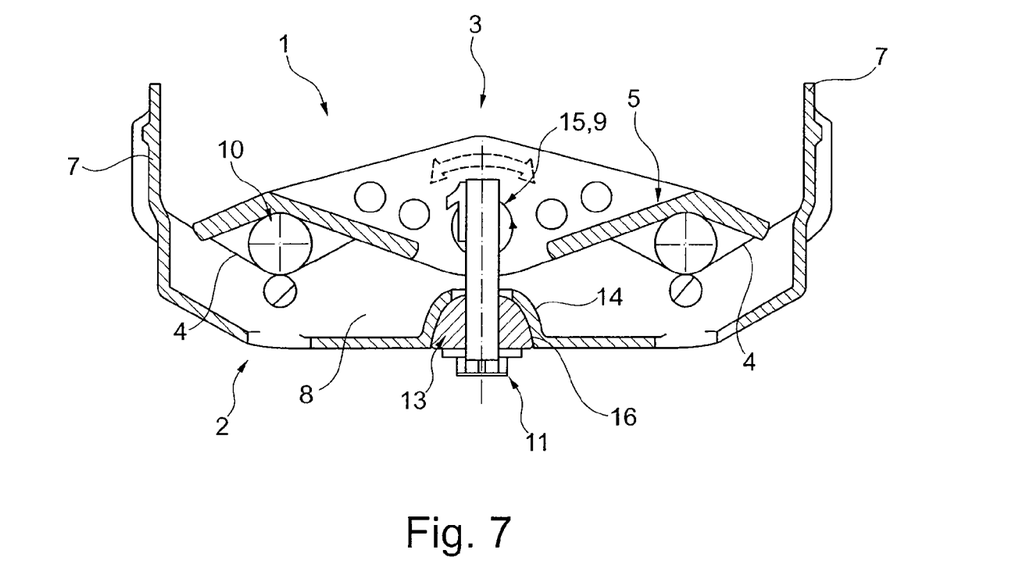
FIG. 7 shows a cross section of a holder module according to an exemplary embodiment of the invention with two small lines.

As shown in particular in FIG. 7, the basic body 2 with its recess 8 is designed in such a way that the cross arm 3 can enter the basic body 2 or its bearing face 4 at least in part. Such a design, as shown in FIGS. 7 and 9, is required because in the case where at least one very small or thin line (for example 10 mm in diameter) is to be accommodated, at least one counter-bearing face 5 moves very close to an associated bearing face 4 of the basic body 2; a situation which, however, due to the wave-shaped design of the bearing faces, in the absence of a recess 8 would result in the bearing faces 4 colliding with the counter-bearing faces 5. In order to prevent such a collision from occurring, as is most clearly shown in conjunction with FIGS. 3 and 4, a recess 8 is provided in the basic body 2, across or crossways the main direction of extension of the bearing faces 4, into which recess 8 the cross arm 3 can at least partly enter on the underside. This design may make it possible to accommodate lines of different thicknesses or of equal thickness in a range from approximately 5 mm to 50 mm.

On the underside of the recess 8 a first abutment 14 in the form of a cupola is provided, in whose underside a ball segment 16 is fitted. Through the ball segment 16 a tensioning element 11 in the form of a screw extends in the direction of the cross arm 3 in order to connect said cross arm 3 to it. In the cross arm 3 a second abutment 15 in the form of a through-opening is formed into which the barrel nut 9 is fitted. In order to connect the cross arm 3 in an articulated manner to the basic body 2, the tensioning element 11 in the form of the screw shown is screwed from below into the barrel nut 9 so that the cross arm 3 has three rotational degrees of freedom and a translatory degree of freedom along the tensioning element. The cross arm 3 is thus able to move in a translatory manner towards the bearing face 4 of the basic body 2 and away from it, as well as being able to rock in the drawing plane of FIG. 7, as indicated by the dual rotary arrow. Furthermore, due to its articulated connection to the basic body 2, the cross arm is able to rotate about the longitudinal axis of the tensioning element 11 perpendicularly to the drawing plane in FIG. 7 and to make a tilting movement into the depth of the drawing plane.

Figure 9:
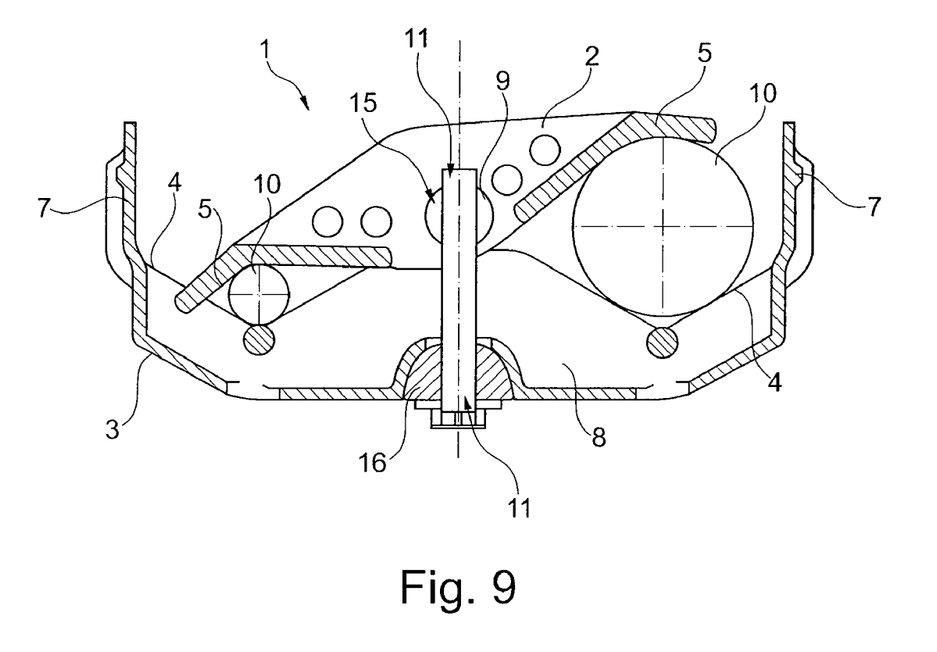
FIG. 9 shows a cross section of a holder module according to an exemplary embodiment of the invention with a large line and a small line.

Thus, as shown in FIG. 9, the cross arm can be rocked in the drawing plane, for example in order to affix two lines of different thicknesses (10 mm and 40 mm) between the counter-bearing faces 5 and the bearing faces 4. As soon as the counter-bearing faces 5 of the cross arm 3 rest loosely against the top of the lines 10, the tensioning element 11, which in the figures is a screw, can be activated, as a result of which the cross arm is firmly drawn towards the lines 10, as a result of which the position of said lines 10 is fixed. In those cases where the tensioning element is a screw, said screw is turned into the barrel nut 9 to such an extent that the distance between the screw head of the screw 11 and the barrel nut 9 is reduced so that the counter-bearing faces 5 tightly rest against the lines 10.

Figure 8:
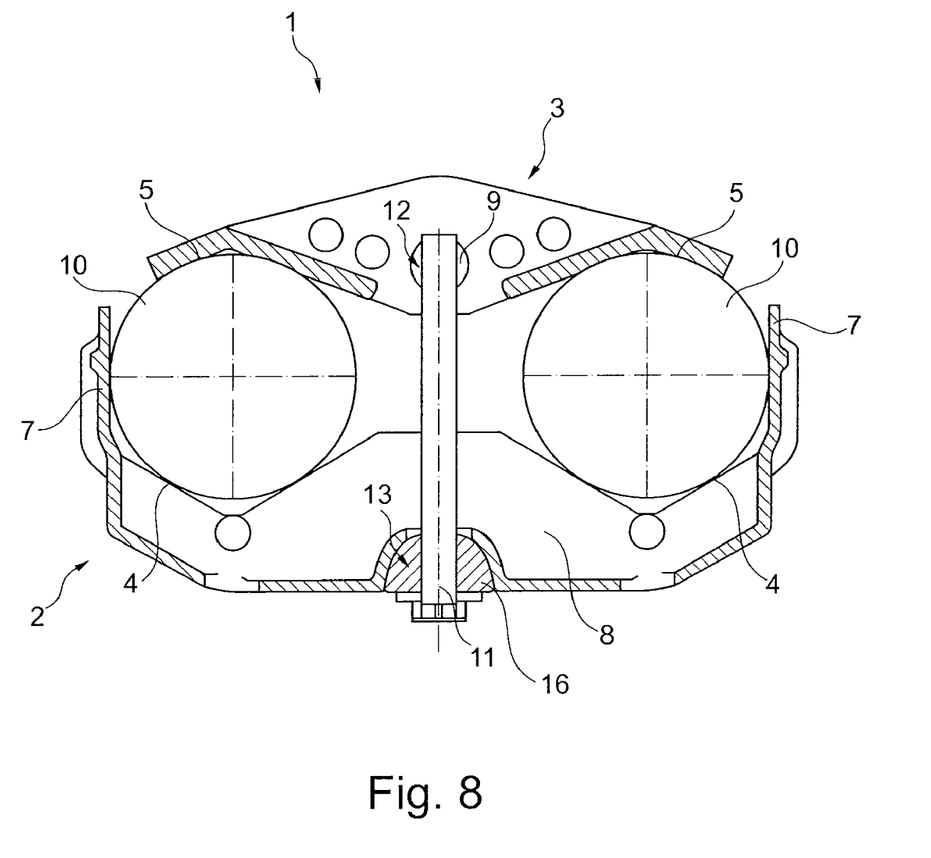
FIG. 8 shows a cross section of a holder module according to an exemplary embodiment of the invention with two large or thick lines.

FIGS. 7 to 9 each show the locked positions of the holder module, which positions are characterised in that the counter-bearing faces 5 of the cross arm 3 face the bearing faces 4 of the basic body 2 at a distance. However, since in these locked positions it is not possible to position a line 10 on a bearing face 4 it is possible to move the cross arm 3 from its locked position to an unlocked position in which the cross arm 3 is rotated from the locked position about the longitudinal axis of the tensioning element 11 by approximately 90° so that the cross arm 3 extends so as to be essentially parallel in relation to the main direction of extension of the bearing faces 4 so that these bearing faces 4 are readily accessible from above. In this unlocked position an exchange of lines or initial installation of a line can be undertaken, with the line subsequently being fixed in the holder module in the activation position of the cross arm 3 in that the cross arm 3 is again rotated by 90°, and subsequently the tensioning element 11 is tightened.

Figure 10:
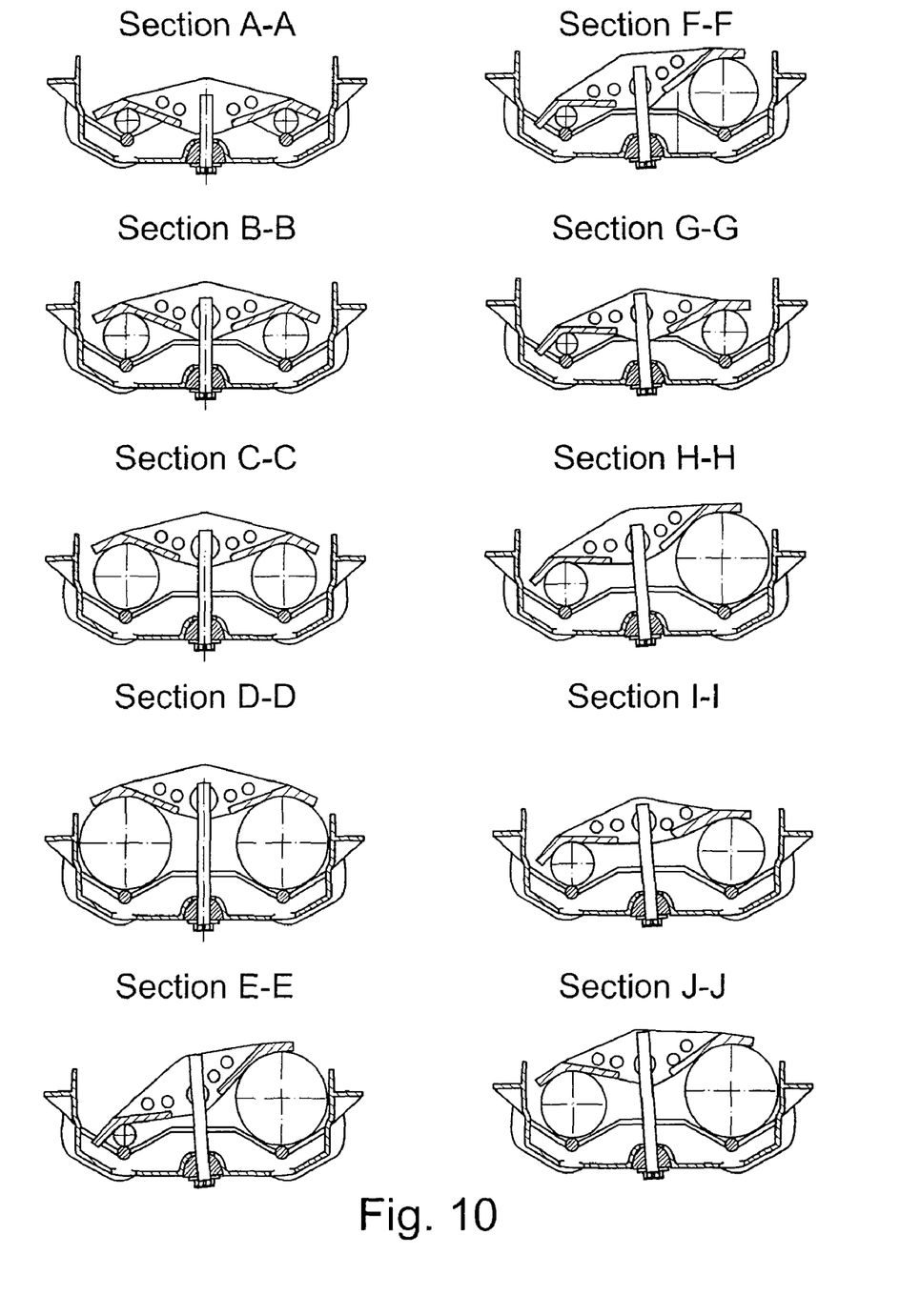
FIG. 10 shows ten cross-sectional views of a holder module according to an exemplary embodiment of the invention, each with different lines.

Finally, FIG. 10 shows a plurality of different positions which the cross arm 3 can take up due to its movable bearing arrangement and design as a balance arm. Thus, in sections A-A to D-D the cross arm 3 is aligned so as to be essentially horizontal, wherein only in section A-A does said cross arm 3 partially enter the opening 8 due to the small diameter of the line 10. In sections E-E, F-F and H-H the holder module accommodates two lines of very different diameters, which results in a considerable inclination of the cross arm 3 in the drawing plane. In contrast to this, the diameters of the lines to be accommodated differ only slightly from each other in the sections G-G, I-I and J-J, which results in a less pronounced inclination of the cross arm 3. As is further shown in the diagrams of FIG. 10, in the case of very large line diameters the lateral flange 7 is used to additionally secure the position of the lines.

Figure 11:
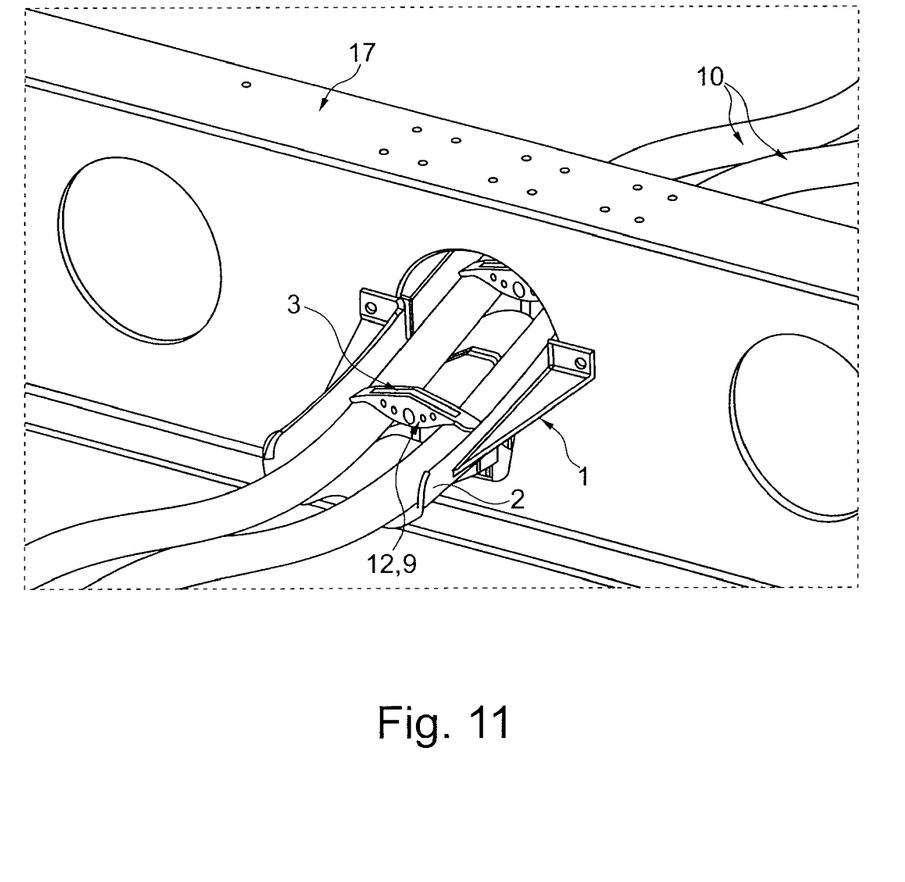
FIG. 11 shows a perspective view of the holder system according to an exemplary embodiment of the invention on a transverse support.
Figure 12:
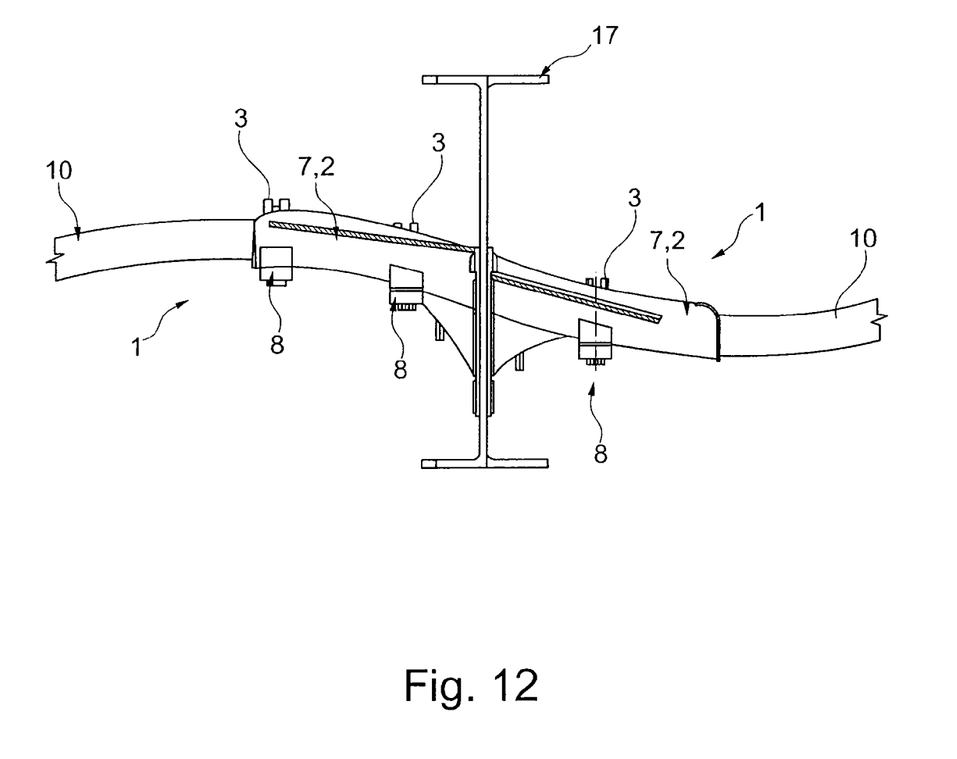
FIG. 12 shows a lateral view of the holder system of FIG. 11.

In conclusion, with reference to FIGS. 11 and 12, the holder module according to an exemplary embodiment of the invention for neatly or regularly leading lines through an aperture in a structural component is explained in more detail. As shown in FIG. 11, several apertures are provided in the transverse support 17, wherein through the middle aperture two lines are to be led from a higher level on the side of the transverse support toward the top of FIG. 11 to a lower level on the side of the transverse support 17 toward the bottom of FIG. 11. To prevent the lines 10 from resting on the relatively sharp edges of the apertures, the holder system according to an exemplary embodiment of the invention is arranged on the transverse support 17, which holder system comprises two holder modules as described above. Thus, on the near side of the transverse support 17 a first holder module 1 is attached to the web of the transverse support 17, and on the other side of the transverse support 17 a second holder module 1 is attached to the web of the transverse support. Preferably the holder modules are affixed to the web of the transverse support 17 such that the contact faces of the two holder modules rest flat against the web of the transverse support 17 and are screwed together or riveted together through corresponding holes in the contact faces through the web of the transverse support 17. In this arrangement the position of the two holder modules 1 in relation to the aperture in the web of the transverse support 17 is aligned such that the bearing faces of the first holder module continue, through the aperture of the web, in the bearing faces of the second holder module. In this way a holder system is created that may make it possible to lead bunches of lines, which are neatly and reliably held, through a structural component, such as for example a transverse support. In cases where the bearing face of the first holder module is positively inclined, and the bearing face of the other holder module is negatively inclined, the holder system according to an exemplary embodiment of the invention may make it possible to reliably and neatly lead a line from one height level to another height level.

It should be noted that the terms "comprising" or "including" do not exclude other elements or steps and the "a" or "an" does not exclude a plurality. Also elements described in association with different embodiments and aspects may be combined. It should also be noted that reference signs in the claims shall not be construed as limiting the scope of the claims.

What is claimed is:

1. A holder module for fixing lines of various thicknesses, the holder module comprising:
   a basic body with at least one bearing face for accommodating a line, and comprising a contact face for attachment of the basic body to a structural component;
   at least one cross arm with at least one counter-bearing face; and
   at least one tensioning element movably connecting the basic body with the at least one cross arm, the tensioning element passing through a ball segment in the basic body;
   wherein the at least one cross arm is movably positioned in relation to the basic body in such a way that the line, due to movement of the at least one cross arm in at least one degree of freedom, is affixed between the at least one bearing face of the basic body and the at least one counter-bearing face of the at least one cross arm,
   wherein the contact face is inclined to the at least one bearing face at an acute angle or at an obtuse angle.

2. The holder module of claim 1,
   wherein the cross arm is held so as to move in a translatory manner towards the basic body and away from the basic body while at the same time carrying out a rocking movement in the manner of a balance arm across the longitudinal alignment of the bearing faces of the basic body.

3. The holder module of claim 1,
   wherein both the at least one bearing face of the basic body, and the at least one counter-bearing face of the at least one cross arm are of conduit-like shape.

4. The holder module of claim 1,
   wherein the basic body comprises two parallel conduit-shaped bearing faces, and wherein the at least one cross section comprises two parallel conduit-shaped counter-bearing faces.

5. The holder module of claim 1, wherein
   the at least one tensioning element is designed to cause the at least one cross arm to move in the direction of the basic body.

6. The holder module of claim 5,
   wherein the at least one tensioning element is designed as a screw.

7. The holder module of claim 5,
   wherein the at least one cross arm is designed as a balance arm, on whose middle the tensioning element acts.

8. The holder module of claim 5,
   wherein the at least one tensioning element extends between a first abutment in the region of at least one opening in the bearing face and a second abutment in the at least one cross arm.

9. The holder module of claim 1,
   wherein the at least one bearing face, in longitudinal direction of the lines to be affixed, has a shape from the group consisting of concave and convex.

10. The holder module according to claim 1,
    wherein the at least one bearing face has an inclination from the group consisting of positive and negative in relation to the contact face.

11. A holder system for regularly leading lines through an aperture in a structural component, comprising:
    a first holder module according to claim 1; and
    a second holder module according to claim 1;
    wherein the contact face of the first holder module is spaced apart from the contact face of the second holder module by the structural component to which the first holder module and the second holder module are affixed by the respective associated contact faces, in such a way that the at least one bearing face of the first holder module continues through the aperture in the at least one bearing face of the second holder module.

12. A method for regularly leading lines through an aperture in a structural component, the method comprising:

attaching a first holder module according to claim 1 on one side of the aperture, with the contact face of said holder module resting against the structural component;

attaching a second holder module according to claim 1 on another side of the aperture, with the contact face of said holder module resting against the structural component;

leading at least one line through the aperture in the structural component;

placing the at least one line onto the at least one bearing face of the first holder module and of the second holder module;

swinging the cross arms of the first holder module and of the second holder module into a position in which the counter-bearing faces of the cross arms face the bearing faces of the basic bodies, spaced apart by the at least one line;

moving the cross arms towards the basic bodies so that the at least one line is firmly clamped between the counter-bearing faces and the bearing faces.

13. An aircraft comprising
at least one line;
structural components; and
a plurality of holder modules according to claim 1,
wherein the at least one line is attached to the structural components, so that the at least one line is routed, at least in sections, through the aircraft.

14. A method of using a plurality of holder modules according to claim 1 comprising the step of affixing at least one line to structural components of an aircraft by the plurality of holder modules so that said at least one line is routed, at least in sections, through the aircraft.

15. A holder module for fixing lines of various thicknesses, the holder module comprising:
a basic body with at least one bearing face for accommodating a line, and comprising a contact face for attachment of the basic body to a structural component; and
at least one cross arm with at least one counter-bearing face;
wherein the at least one cross arm is movably positioned in relation to the basic body in such a way that the line, due to movement of the at least one cross arm in at least one degree of freedom, is affixed between the at least one bearing face of the basic body and the at least one counter-bearing face of the at least one cross arm,
wherein the contact face is inclined to the at least one bearing face at an acute angle or at an obtuse angle; and
wherein in the bearing face of the basic body at least one opening is provided for at least partly accommodating movement of the at least one cross arm through the at least one opening, thereby preventing the at least one counter-bearing face from contacting the at least one bearing face.

16. A holder module for fixing lines of various thicknesses, the holder module comprising:
a basic body with at least one bearing face for accommodating a line, and comprising a contact face for attachment of the basic body to a structural component;
at least one cross arm with at least one counter-bearing face; and
at least one tensioning element that movably connects the at least one cross arm to the basic body, which tensioning element is designed to cause the at least one cross arm to move in the direction of the basic body;
wherein the at least one cross arm is movably positioned in relation to the basic body in such a way that the line, due to movement of the at least one cross arm in at least one degree of freedom, is affixed between the at least one bearing face of the basic body and the at least one counter-bearing face of the at least one cross arm, wherein the at least one tensioning element extends between a first abutment in the region of at least one opening in the bearing face and a second abutment in the at least one cross arm, and
wherein the first abutment accommodates a ball segment in conjunction with which it forms a ball joint that provides three degrees of freedom or rotation, wherein the ball joint is arranged in the at least one opening and between two parallel conduit-like bearing faces.

17. A holder module for fixing lines of various thicknesses, the holder module comprising:
a basic body with at least one bearing face for accommodating a line, and comprising a contact face for attachment of the basic body to a structural component;
at least one cross arm with at least one counter-bearing face; and
at least one tensioning element that movably connects the at least one cross arm to the basic body, which tensioning element is designed to cause the at least one cross arm to move in the direction of the basic body;
wherein the at least one cross arm is movably positioned in relation to the basic body in such a way that the line, due to movement of the at least one cross arm in at least one degree of freedom, is affixed between the at least one bearing face of the basic body and the at least one counter-bearing face of the at least one cross arm, wherein the at least one tensioning element extends between a first abutment in the region of at least one opening in the bearing face and a second abutment in the at least one cross arm, and
wherein the second abutment accommodates a cylinder in conjunction with which it forms a hinge joint that is arranged in the at least one cross arm between two parallel conduit-like counter-bearing faces, and whose swivelling axis extends in the direction of the two parallel conduit-like counter-bearing faces.

18. The holder module of claim 17,
wherein as a tensioning element a screw is screwed through a ball segment into the cylinder.

19. A holder module for fixing lines of various thicknesses, the holder module comprising:
a basic body with at least one bearing face for accommodating a line, and comprising a contact face for attachment of the basic body to a structural component;
at least one cross arm with at least one counter-bearing face; and
at least one tensioning element movably connecting the basic body with the at least one cross arm, the tensioning element passing through a ball segment in the basic body;
wherein the at least one cross arm is movably positioned in relation to the basic body in such a way that the line, due to movement of the at least one cross arm in at least one degree of freedom, is affixed between the at least one bearing face of the basic body and the at least one counter-bearing face of the at least one cross arm,
wherein the contact face is inclined to the at least one bearing face at an angle in a range from an acute angle to an obtuse angle.

* * * * *